United States Patent
Schulten (10) Patent No.: US 8,222,757 B2
(45) Date of Patent: Jul. 17, 2012

(54) LOAD IDENTIFICATION SYSTEM AND METHOD OF ASSEMBLING THE SAME

(75) Inventor: Christoph Schulten, Salzbergen (DE)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 12/478,871

(22) Filed: Jun. 5, 2009

(65) Prior Publication Data

US 2010/0133814 A1   Jun. 3, 2010

(51) Int. Cl.
  *H20K 7/00* (2006.01)
(52) U.S. Cl. .......................... 290/44; 290/43
(58) Field of Classification Search .............. 290/44
  See application file for complete search history.

(56) References Cited

U.S. PATENT DOCUMENTS

| | | | |
|---|---|---|---|
| 5,804,899 A * | 9/1998 | Jamain et al. ............. | 310/90.5 |
| 6,619,918 B1 | 9/2003 | Rebsdorf | |
| 6,876,099 B2 * | 4/2005 | Wobben ..................... | 290/44 |
| 6,888,262 B2 | 5/2005 | Blakemore | |
| 6,940,186 B2 | 9/2005 | Weitkamp | |
| 7,004,724 B2 | 2/2006 | Pierce et al. | |
| 7,086,834 B2 | 8/2006 | LeMieux | |
| 7,095,129 B2 | 8/2006 | Moroz | |
| 7,118,339 B2 | 10/2006 | Moroz et al. | |
| 7,160,083 B2 | 1/2007 | Pierce et al. | |
| 7,312,537 B1 * | 12/2007 | Walling ...................... | 290/44 |
| 7,322,794 B2 | 1/2008 | LeMieux et al. | |
| 7,342,323 B2 * | 3/2008 | Avagliano et al. ......... | 290/55 |
| 7,348,683 B2 * | 3/2008 | Riesberg ................... | 290/1 R |
| 7,351,033 B2 | 4/2008 | McNerney | |
| 7,352,075 B2 * | 4/2008 | Willey et al. ............. | 290/44 |
| 7,355,294 B2 * | 4/2008 | Teichmann ................ | 290/44 |
| 7,541,686 B2 * | 6/2009 | Fahrenbach ............... | 290/44 |
| 2007/0294049 A1 | 12/2007 | Pierce et al. | |
| 2008/0069692 A1 | 3/2008 | Oohara et al. | |
| 2009/0021015 A1 | 1/2009 | Pedersen | |
| 2009/0047130 A1 | 2/2009 | Egedal | |
| 2009/0266160 A1 | 10/2009 | Jeffrey et al. | |

FOREIGN PATENT DOCUMENTS

| | | |
|---|---|---|
| EP | 1835293 A1 | 9/2007 |
| WO | 2007104306 A1 | 9/2007 |
| WO | 2009001310 A1 | 12/2008 |

* cited by examiner

*Primary Examiner* — Tulsidas C Patel
*Assistant Examiner* — Iraj A Mohandesi
(74) *Attorney, Agent, or Firm* — James McGinness; Armstrong Teasdale LLP (57) ABSTRACT

A method of identifying a load on a wind turbine is provided. The method includes sensing accelerations of a rotor in a plurality of dimensions via at least one acceleration sensor and transmitting, from the acceleration sensor, signals indicative of the sensed accelerations to a control system. The method also includes receiving, at the control system, the transmitted signals from the acceleration sensor and identifying, via the control system, a load on the wind turbine based on the received signals.

10 Claims, 6 Drawing Sheets

LOAD IDENTIFICATION SYSTEM AND METHOD OF ASSEMBLING THE SAME

BACKGROUND OF THE INVENTION

The field of this disclosure relates generally to load identification and, more particularly, to a load identification system and a method of assembling the same.

Many known wind turbines include a tower and a rotor mounted on the tower via a nacelle. The rotor has a number of blades extending therefrom to facilitate converting wind energy into rotational energy. The rotor drives a generator through a gearbox via a rotor shaft, and the gear box steps up the inherently low rotational speed of the rotor shaft such that the generator can convert the mechanical energy to electrical energy.

Because many known wind turbines provide electrical power to utility grids, at least some wind turbines have larger components (e.g., rotors in excess of thirty-meters in diameter) that facilitate supplying greater quantities of electrical power. However, the larger components are often subjected to increased loads (e.g., asymmetric loads) that result from wind shears, yaw misalignment, and/or turbulence, and the increased loads have been known to contribute to significant fatigue cycles on the rotor blades and/or other components of the wind turbine. As such, it would be useful to provide a system that facilitates identifying loads on components of wind turbines, such as the rotor blades and/or the rotor, so that the loads can be reduced.

BRIEF DESCRIPTION OF THE INVENTION

In one aspect, a method of identifying a load on a wind turbine is provided. The method includes sensing accelerations of a rotor in a plurality of dimensions via at least one acceleration sensor and transmitting, from the acceleration sensor, signals indicative of the sensed accelerations to a control system. The method also includes receiving, at the control system, the transmitted signals from the acceleration sensor and identifying, via the control system, a load on the wind turbine based on the received signals.

In another aspect, a method of assembling a load identification system to a wind turbine is provided. The wind turbine has a rotor including a rotatable hub and a plurality of rotor blades coupled to the hub. The method includes coupling at least one acceleration sensor to the rotor and communicatively coupling the acceleration sensor with a control system. The acceleration sensor is configured to sense accelerations of the rotor in three dimensions and to transmit signals indicative of the sensed accelerations to the control system. The control system is configured to receive the signals from the acceleration sensor and to identify a load on the wind turbine based on the received signals.

In another aspect, a load identification system for a wind turbine including a rotor is provided. The load identification system includes a control system and at least one acceleration sensor mountable on the rotor and communicatively coupled with the control system. The acceleration sensor is configured to sense accelerations of the rotor in three dimensions and to transmit signals indicative of the sensed accelerations to the control system. The control system is configured to receive the signals from the acceleration sensor and to identify a load on the wind turbine based on the received signals.

DETAILED DESCRIPTION OF THE INVENTION

The following detailed description illustrates a load identification system by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to an exemplary embodiment, namely, a load identification system for a wind turbine. However, it is contemplated that this disclosure has general application to load identification in a broad range of systems and in a variety of applications other than wind turbines.

Figure 1:
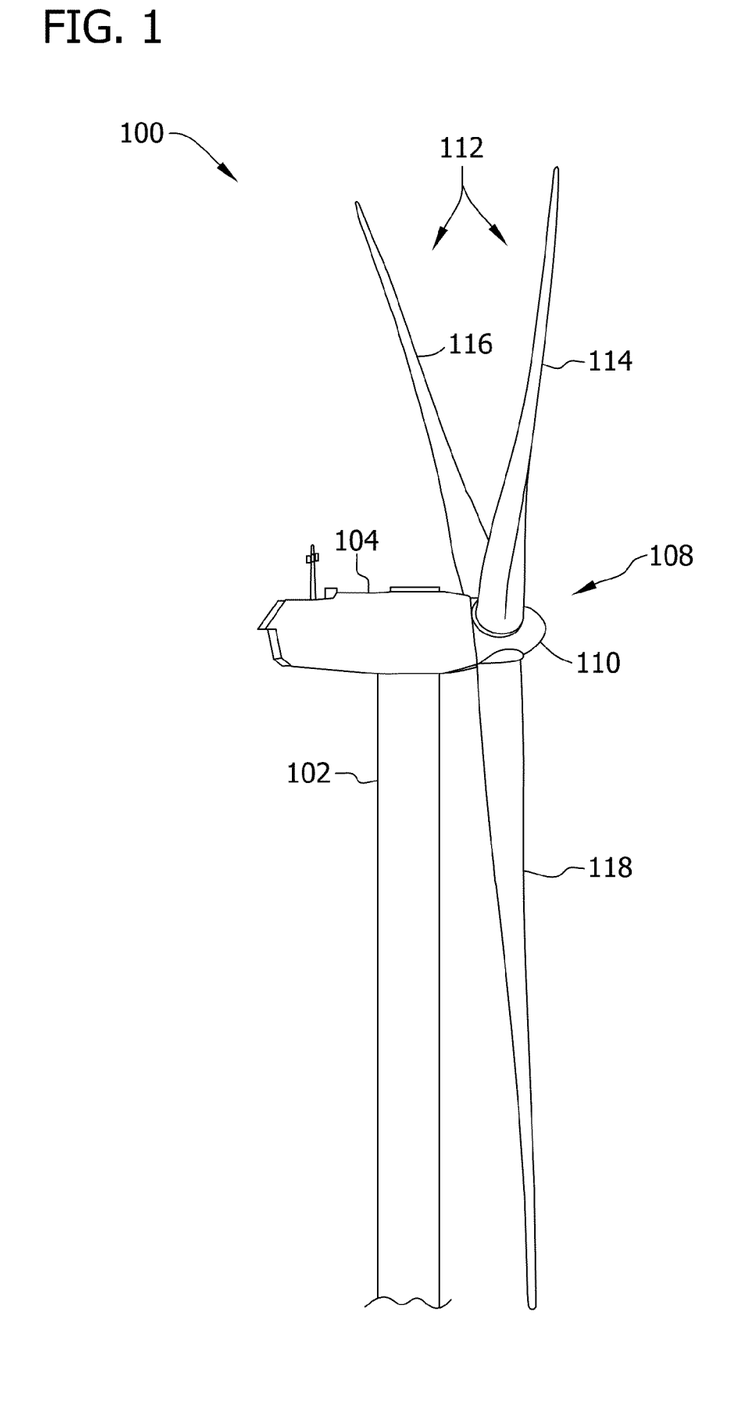
FIG. 1 is a side elevation view of a wind turbine.

FIG. 1 is a side elevation view of an exemplary wind turbine 100. In the exemplary embodiment, wind turbine 100 is a horizontal axis wind turbine. Alternatively, wind turbine 100 may be a vertical axis wind turbine. Wind turbine 100 includes a tower 102 erected from a foundation (not shown), a nacelle 104 mounted on tower 102, and a rotor 108 coupled to nacelle 104. Rotor 108 includes a rotatable hub 110 and a plurality of rotor blades 112 coupled to and extending outwardly from hub 110. In the exemplary embodiment, rotor blades 112 include a first rotor blade 114, a second rotor blade 116, and a third rotor blade 118. In other embodiments, rotor 108 may include any suitable number of rotor blades 112. In the exemplary embodiment, rotor blades 112 are equidistantly spaced about hub 110 to facilitate enabling kinetic energy of the wind to be converted into rotational energy and, subsequently, into electrical energy. Alternatively, rotor blades 112 may be spaced any suitable distance from one another about hub 110.

Figure 2:
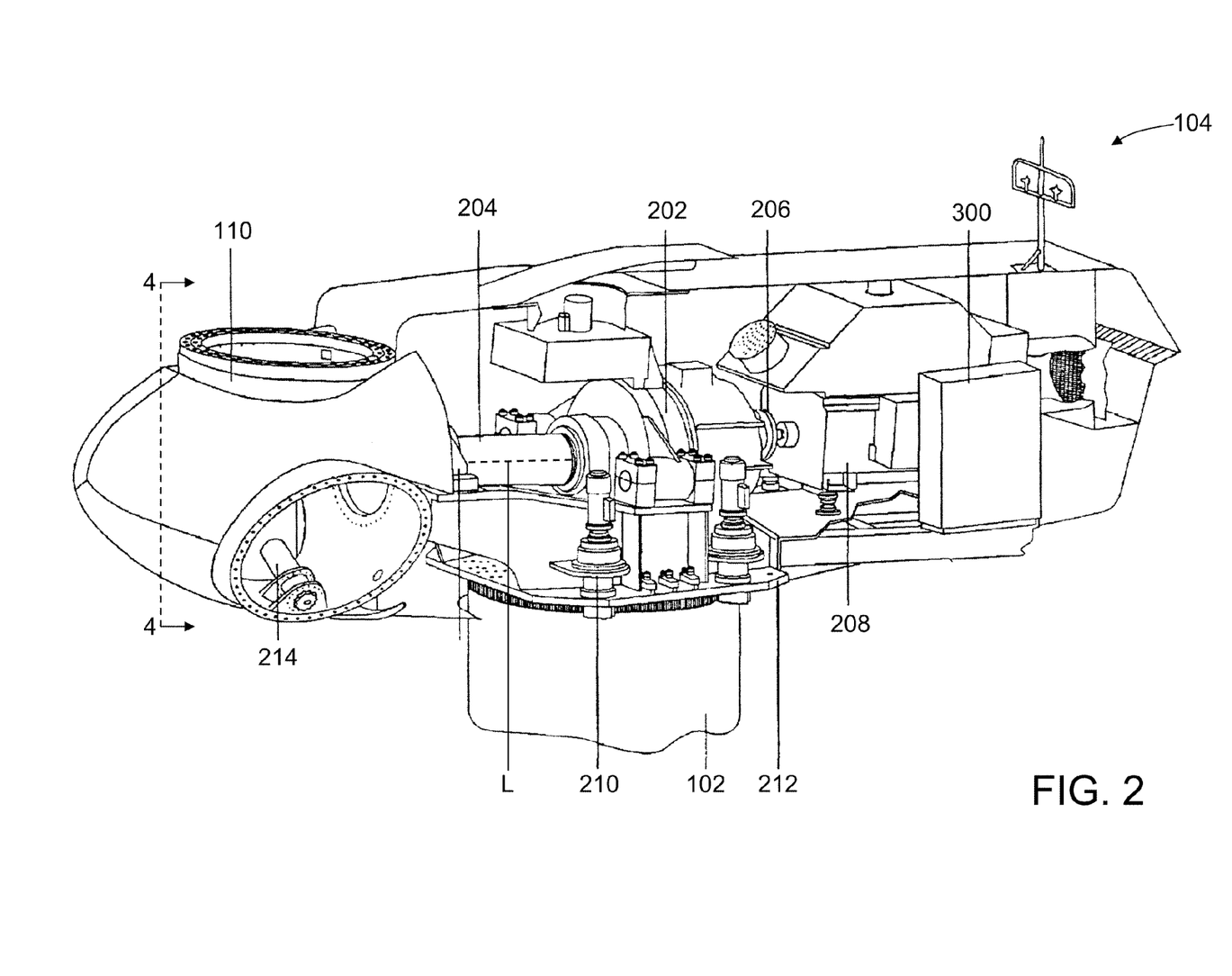
FIG. 2 is an enlarged perspective view of a nacelle of the wind turbine shown in FIG. 1.

FIG. 2 is an enlarged perspective view of nacelle 104. In the exemplary embodiment, nacelle 104 includes a gear box 202, a rotor shaft 204, a high-speed shaft 206, and a generator 208. Rotor shaft 204, having a longitudinal axis L, rotatably couples hub 110 to gear box 202, and high-speed shaft 206 rotatably couples gear box 202 to generator 208. Nacelle 104 also includes a yaw drive 210 and a yaw deck 212 that facilitate adjusting a yaw of wind turbine 100, a pitch drive 214 associated with each blade 114, 116, 118 to facilitate independently adjusting a pitch of each blade 114, 116, 118, and a control system 300 that facilitates controlling an operation of wind turbine 100 (e.g., controlling an operation of pitch drive 214, yaw drive 210, etc.). In alternative embodiments, control system 300 may be mounted at any suitable location on wind turbine 100 that enables control system 300 to function as described herein.

Figure 3:
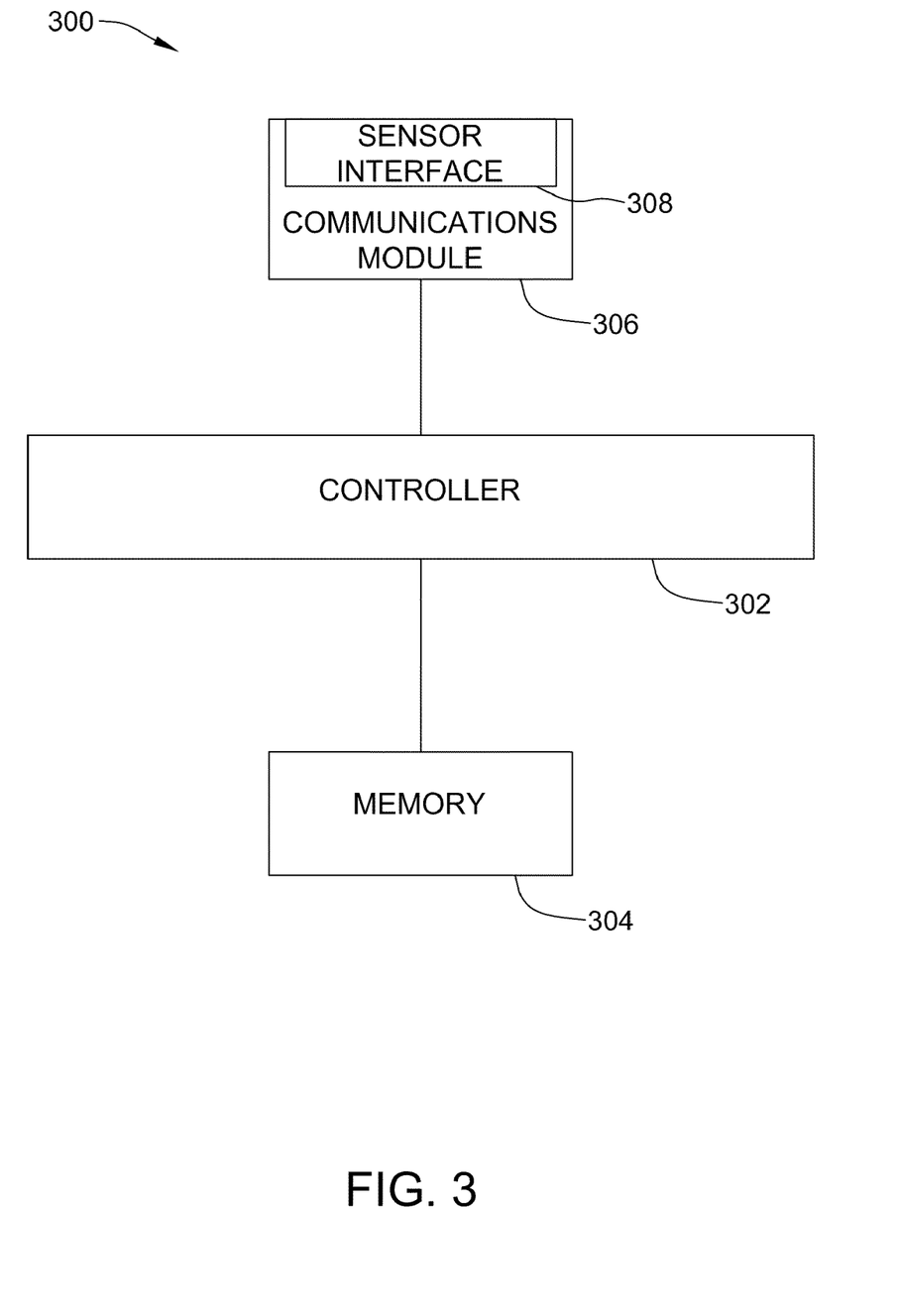
FIG. 3 is a block diagram of a control system of the wind turbine shown in FIG. 1.

FIG. 3 is a block diagram of an exemplary control system 300. In the exemplary embodiment, control system 300 includes a controller 302, a memory 304, and a communications module 306. Alternatively, control system 300 may include any suitable device that enables control system 300 to function as described herein. In the exemplary embodiment, communications module 306 includes a sensor interface 308 that facilitates enabling controller 302 to communicate with at least one sensor mounted at any suitable location on wind turbine 100. In one embodiment, sensor interface 308 includes an analog-to-digital converter that converts an analog voltage signal generated by the sensors to a multi-bit digital signal usable by controller 302. In other embodiments, communications module 306 may include any suitable wired and/or wireless communications device that facilitates transmitting signals to and/or receiving signals from any device located on wind turbine 100 and/or remotely from wind turbine 100. In the exemplary embodiment, memory 304 may include any suitable storage device, including, but not limited to, flash memory, electronically erasable programmable memory, read only memory (ROM), removable media, and/or other volatile and non-volatile storage devices. In one embodiment, executable instructions (i.e., software instructions) are stored in memory 304 for use by controller 302 in controlling wind turbine 100 (e.g., pitch drive 214), as described below.

In the exemplary embodiment, controller 302 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 302 may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome. As used herein, the term "processor" is not limited to only integrated circuits referred to in the art as a processor but broadly refers to a computer, a microcontroller, a microcomputer, a programmable logic controller, an application specific integrated circuit and any other programmable circuit.

Figure 4:
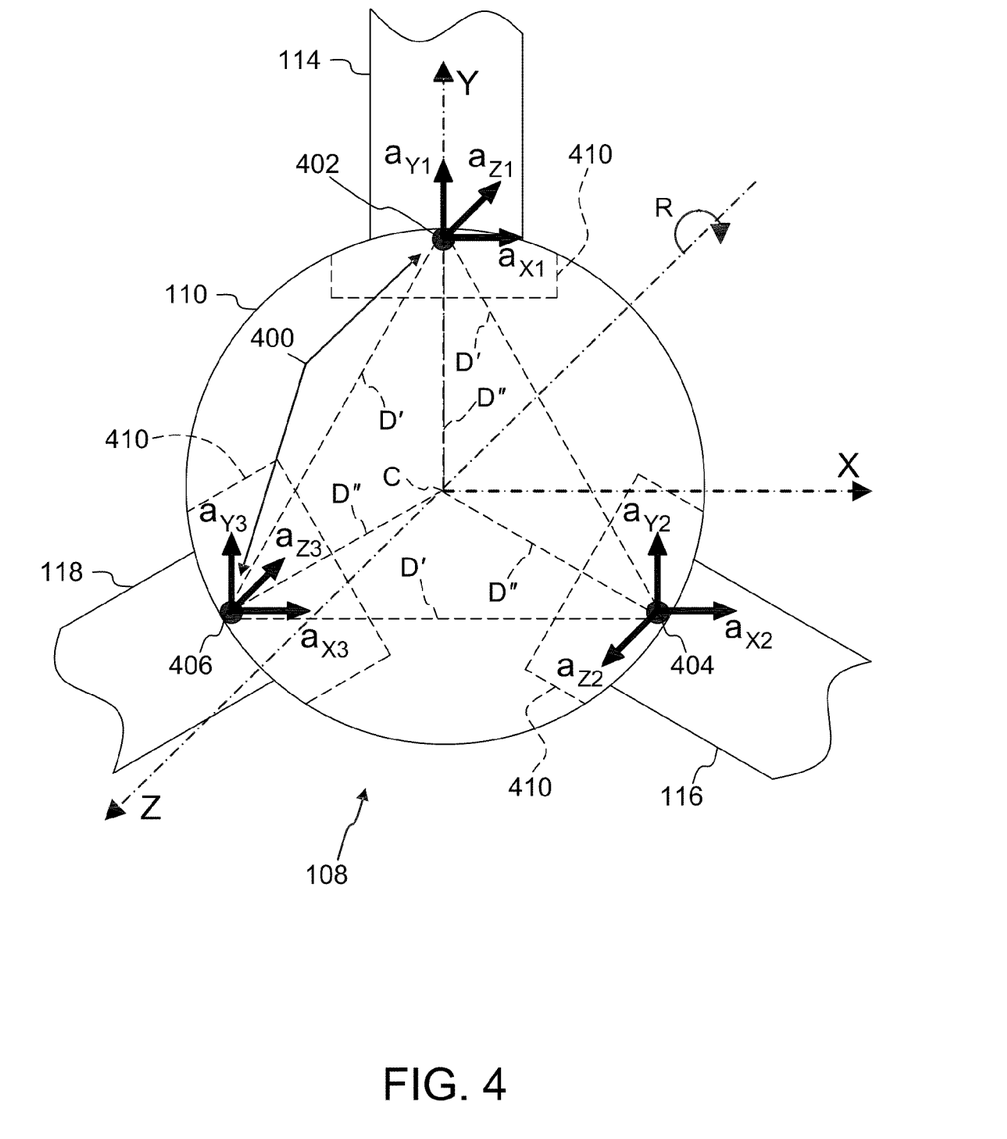
FIG. 4 is a schematic cross-sectional view of a hub of the wind turbine shown in FIG. 1.

FIG. 4 is a schematic cross-sectional view of hub 110 taken along line 4-4 (shown in FIG. 2) with blades 114, 116, 118 coupled to hub 110. In the exemplary embodiment, three mutually perpendicular axes X, Y, and Z extend through hub 110 to define a three-dimensional Cartesian coordinate system relative to a center C of hub 110. In the exemplary embodiment, axis Z is coaxial with longitudinal axis L of rotor shaft 204. In other embodiments, axis Z may be oriented in any suitable direction relative to rotor shaft 204.

In the exemplary embodiment, a plurality of acceleration sensors 400 are mounted within hub 110 to facilitate sensing accelerations of rotor 108 in dimensions X, Y, and/or Z. Specifically, in one embodiment, acceleration sensors 400 include a first acceleration sensor 402 mounted with respect to (e.g., adjacent) first blade 114 to facilitate sensing a first acceleration vector $A_{X1}$ of rotor 108 in dimension X, a first acceleration vector $A_{Y1}$ of rotor 108 in dimension Y, and a first acceleration vector $A_{Z1}$ of rotor 108 in dimension Z. A second acceleration sensor 404 is mounted with respect to (e.g., adjacent) second blade 116 to facilitate sensing a second acceleration vector $A_{X2}$ of rotor 108 in dimension X, a second acceleration vector $A_{Y2}$ of rotor 108 in dimension Y, and a second acceleration vector $A_{Z2}$ of rotor 108 in dimension Z. A third acceleration sensor 406 is mounted with respect to (e.g., adjacent) third blade 118 to facilitate sensing a third acceleration vector $A_{X3}$ of rotor 108 in dimension X, a third acceleration vector $A_{Y3}$ of rotor 108 in dimension Y, and a third acceleration vector $A_{Z3}$ of rotor 108 in dimension Z. During an operation of wind turbine 100, sensed acceleration vectors $A_{X1}$, $A_{X2}$, $A_{X3}$, $A_{Y1}$, $A_{Y2}$, $A_{Y3}$, $A_{Z1}$, $A_{Z2}$, and $A_{Z3}$ may have any magnitude and/or any direction, and the magnitudes and the directions shown in FIG. 4 are intended to be exemplary and are not intended to limit the scope of the present invention. In alternative embodiments, acceleration sensors 400 may be mounted at any suitable location on wind turbine 100 that enables control system 300 to function as described herein.

In the exemplary embodiment, acceleration sensors 402, 404, 406 are spaced a first distance D' apart from one another (i.e., substantially equidistantly apart from one another in accordance with the spacing of blades 114, 116, 118) and a second distance D" from center C (i.e., substantially equidistantly from center C and apart from rotor shaft 204). In one embodiment, each acceleration sensor 402, 404, 406 may be mounted on, or adjacent to, hub 110 (e.g., each acceleration sensor 402, 404, 406 may be mounted within a separate axis box 410 associated with each blade 114, 116, 118). Alternatively, any suitable number of acceleration sensors 400 may be mounted in any suitable location within hub 110 and/or external of hub 110 that enables control system 300 to function as described herein.

In the exemplary embodiment, acceleration sensors 402, 404, 406 are communicatively coupled to controller 302 across any suitable wired and/or wireless communication medium via sensor interface 308 of communications module 306 to facilitate enabling acceleration sensors 402, 404, 406 to transmit signals to and/or receive signals from controller 302. In the exemplary embodiment, each acceleration sensor 402, 404, 406 continuously senses accelerations of rotor 108 in all three dimensions X, Y, and Z, and each acceleration sensor 402, 404, 406 continuously transmits signals indicative of sensed acceleration vectors $A_{X1}$, $A_{X2}$, $A_{X3}$, $A_{Y1}$, $A_{Y2}$, $A_{Y3}$, $A_{Z1}$, $A_{Z2}$, and/or $A_{Z3}$ to controller 302 in real-time. In one embodiment, controller 302 may be programmed to continuously receive and monitor the signals transmitted by acceleration sensors 402, 404, 406. In another embodiment, controller 302 may not continuously receive and/or monitor the signals transmitted by acceleration sensors 402, 404, 406 but, rather, may be programmed to iteratively request signals from acceleration sensors 402, 404, 406 at predetermined time intervals. In some embodiments, controller 302 and/or acceleration sensors 402, 404, 406 may transmit signals to and/or receive signals from one another at any suitable time intervals. In other embodiments, acceleration sensors 402, 404, and/or 406 may sense accelerations in any suitable number of dimensions.

In the exemplary embodiment, controller 302 is programmed to be calibrated when wind turbine 100 is substantially unloaded (e.g., during a non-operational state of wind turbine 100). In a particular embodiment, controller 302 is programmed to store an unloaded position of rotor 108 (i.e., a position of rotor 108 in all three dimensions X, Y, and Z) in memory 304 and to identify the unloaded position as being a "zero" position of rotor 108.

After identifying the "zero" position of rotor 108 and during an operation of wind turbine 100, controller 302 is programmed to process signals received from acceleration sensors 402, 404, 406 to facilitate calculating displacements of rotor 108 from the "zero" position in all three dimensions X, Y, and Z. In the exemplary embodiment, controller 302 is programmed to receive signals corresponding to sensed acceleration vectors $A_{X1}$, $A_{Y1}$, and/or $A_{Z1}$ from first acceleration sensor 402, to receive signals corresponding to sensed acceleration vectors $A_{X2}$, $A_{Y2}$, and/or $A_{Z2}$ from second acceleration sensor 404, and to receive signals corresponding to sensed acceleration vectors $A_{X3}$, $A_{Y3}$, and/or $A_{Z3}$ from third acceleration sensor 406, and controller 302 is programmed to associate an acceleration value (i.e., a value indicative of the magnitude and/or the direction of each acceleration vector) with each received signal.

Figure 5:
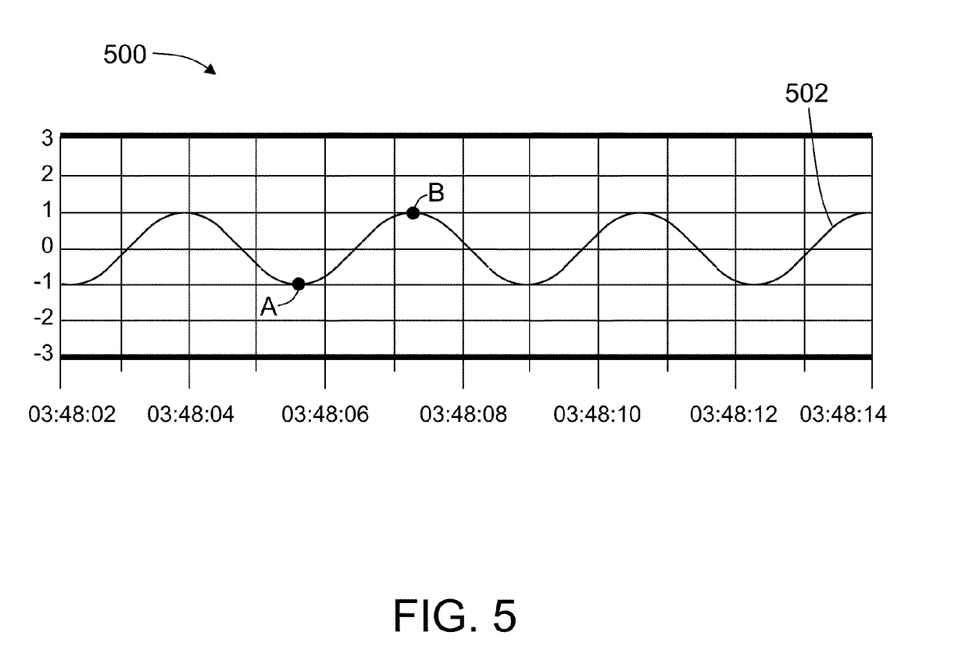
FIG. 5 is a graphical representation of an acceleration pattern of a blade coupled to the hub shown in FIG. 4.

After associating an acceleration value with each received signal, controller 302 is programmed to identify a rotational speed of rotor 108 in a rotational direction R and/or a rotational order of rotor 108 in dimensions X and Y (i.e., a position of each blade 114, 116, 118 in the plane defined by axes X and Y) using at least one of the acceleration values associated with sensed acceleration vectors $A_{X1}$, $A_{X2}$, $A_{X3}$, $A_{Y1}$, $A_{Y2}$, and/or $A_{Y3}$. In one embodiment, controller 302 may be programmed to continuously input the acceleration values associated with sensed acceleration vectors $A_{X1}$, $A_{X2}$, $A_{X3}$, $A_{Y1}$, $A_{Y2}$, and/or $A_{Y3}$ into a first mathematical model that facilitates identifying the sinusoidal acceleration pattern of rotor 108 (i.e., represented graphically as a sinusoidal acceleration curve) caused, in part, by the gravitational forces acting on rotor 108 and identifying a position of each blade 114, 116, 118 as corresponding to a particular point in the acceleration pattern (e.g., as a particular point on the sinusoidal acceleration curve). For example, in one embodiment, controller 302 may be programmed to identify a sinusoidal acceleration pattern 500 (represented graphically in FIG. 5 as an acceleration curve 502) for blade 114 using the signals indicative of sensed accelerations $A_{Y1}$, and controller 302 may also be programmed to determine that, at a point A on acceleration curve 502, blade 114 is oriented at an angle of 0° in the plane defined by axes X and Y (i.e., blade 114 is pointing straight upward) and that, at a point B on acceleration curve 502, blade 114 is oriented at an angle of 180° in the plane defined by axes X and Y (i.e., blade 114 is pointing straight downward). In other embodiments, controller 302 may be programmed to identify an acceleration pattern of any suitable number of blades and to determine a position of the blades at any suitable point in the acceleration pattern.

After identifying a rotational order of rotor 108 in dimensions X and Y, controller 302 is programmed to calculate a displacement of rotor 108 from the "zero" position using the acceleration values associated with acceleration vectors $A_{Z1}$, $A_{Z2}$, and/or $A_{Z3}$. In the exemplary embodiment, controller 302 is programmed to generate at least one acceleration function indicative of the acceleration vectors $A_{Z1}$, $A_{Z2}$, and/or $A_{Z3}$ and the rotational order of rotor 108. Controller 302 is programmed to then integrate the acceleration function to express the acceleration function as a corresponding velocity function, and to subsequently integrate the velocity function to express the velocity function as a corresponding displacement function. Using the displacement function, controller 302 is programmed to then calculate a displacement of rotor 108 from the "zero" position to facilitate identifying loads on wind turbine 100 (i.e., loads on rotor 108, nacelle 104, and/or tower 102) at any point in time. Alternatively, controller 302 may be programmed to process any suitable number of signals associated with any suitable number of sensed acceleration vectors via any suitable mathematical model in order to facilitate identifying a load on wind turbine 100.

In some embodiments, controller 302 may be programmed to calculate a displacement of rotor 108 using the sensed acceleration vectors of a first predetermined group of acceleration sensors 400 and to identify the sensed acceleration vectors of a second predetermined group of acceleration sensors 400 as being redundant. In the exemplary embodiment, controller 302 may be programmed to calculate a displacement using only signals received from first acceleration sensor 402 and second acceleration sensor 404 (i.e., using only acceleration vectors $A_{X1}$, $A_{Y1}$, $A_{Z1}$, $A_{X2}$, $A_{Y2}$, and/or $A_{Z2}$). As such, the signals received from third acceleration sensor 406 may be identified by controller 302 as being redundant and may be used by controller 302 in the event that first acceleration sensor 402 and/or second acceleration sensor 404 is non-operational or faulty. In other embodiments, controller 302 may be programmed to calculate a displacement of rotor 108 using the sensed acceleration vectors from any suitable number of acceleration sensors 400 and to identify the signals received from any suitable number of acceleration sensors 400 as being redundant.

In the exemplary embodiment, controller 302 is further programmed to control at least one device of wind turbine 100 in response to an identified load on wind turbine 100 to facilitate reducing the load on wind turbine 100. In one embodiment, controller 302 may be configured to control pitch drive 214 in response to an identified load on wind turbine 100 (i.e., to change a pitch of first blade 114, second blade 116, and/or third blade 118); to slow a rotation of hub 110 and/or rotor shaft 204 in response to an identified load on wind turbine 100; and/or to slow a rotation of high-speed shaft 206 in response to an identified load on wind turbine 100. In other embodiments, controller 302 may be programmed to control any suitable device of wind turbine 100 to facilitate reducing a load on wind turbine 100 (e.g., to transform a load identified by controller 302 as being asymmetric into a load identified by controller 302 as being generally symmetric).

Figure 6:
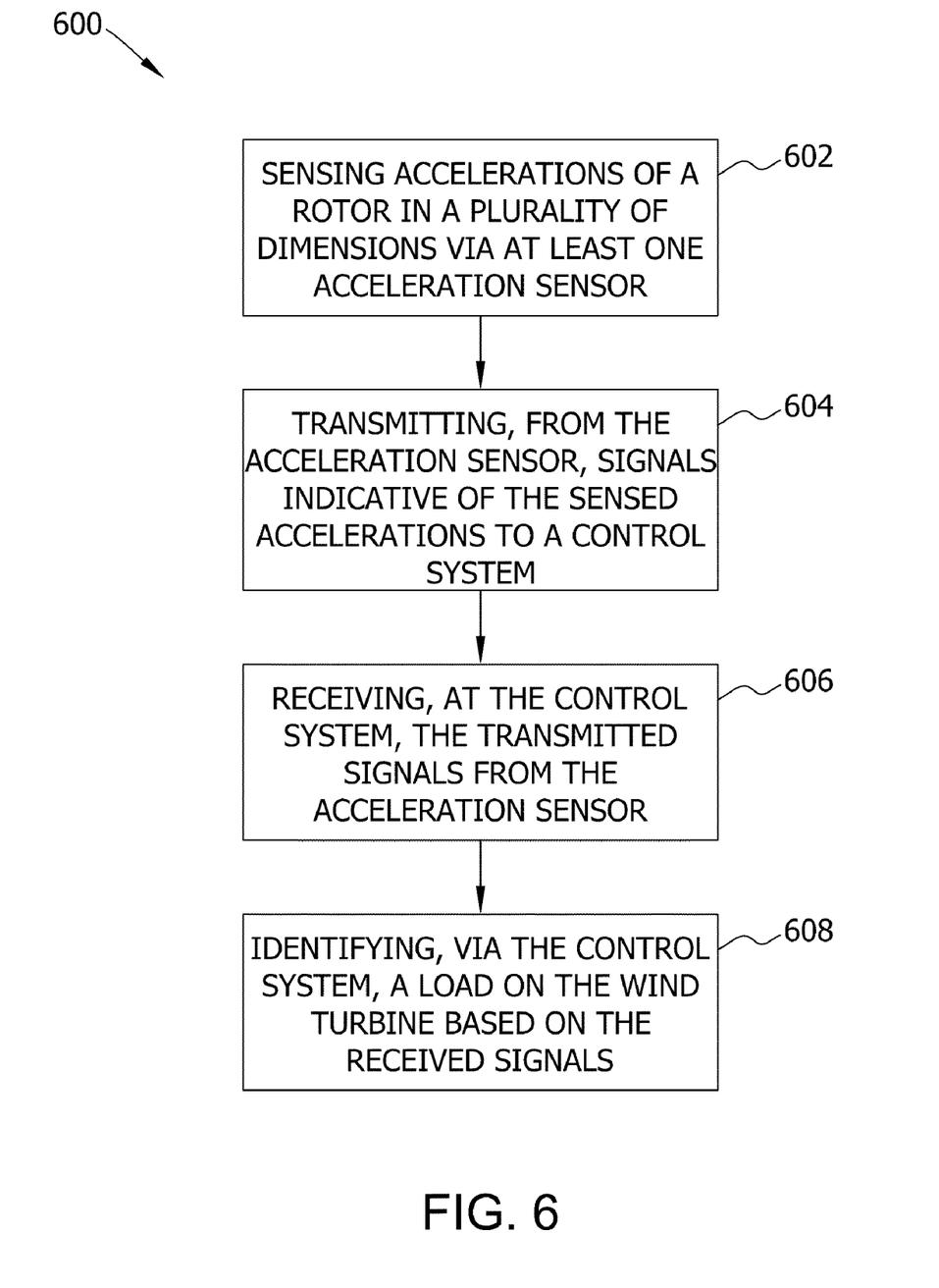
FIG. 6 is a flow chart of a method of identifying a load on the wind turbine shown in FIG. 1.

FIG. 6 is a flow chart of a method 600 of identifying a load on wind turbine 100. In the exemplary embodiment, method 600 includes sensing 602 accelerations of rotor 108 in a plurality of dimensions via at least one of acceleration sensors 400; transmitting 604, from acceleration sensor 400, signals indicative of the sensed accelerations to control system 300; receiving 606, at control system 300, the transmitted signals from acceleration sensor 400; and identifying 608, via control system 300, a load on wind turbine 100 based on the received signals. In other embodiments, method 600 may include any suitable step associated with facilitating an identification of a load on wind turbine 100, as described herein. In some embodiments, various other suitable methods associated with facilitating identification of a load on wind turbine 100 are provided (e.g., a method of assembling a load identification system to wind turbine 100).

The methods and systems described herein facilitate identifying a load (e.g., a thrust/bending load) on a component of a wind turbine using acceleration sensors. More specifically, the methods and systems described herein facilitate identifying a load on a rotor by sensing an acceleration of the rotor in three dimensions. As such, the methods and systems described herein facilitate minimizing the equipment used to identify dynamic loads on a rotor, thereby reducing a manufacturing cost associated with fabricating a wind turbine while increasing a reliability of the wind turbine and extending a useful life of the wind turbine.

Exemplary embodiments of load identification systems are described above in detail. The methods and systems described herein are not limited to the specific embodiments described herein, but rather, components of the methods and systems may be utilized independently and separately from other components described herein. For example, the methods and systems described herein may have other applications not limited to practice with wind turbines, as described herein. Rather, the methods and systems described herein can be implemented and utilized in connection with various other industries.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of identifying a load on a wind turbine, said method comprising:
    sensing accelerations of a rotor in a plurality of dimensions via at least one acceleration sensor;
    transmitting, from the acceleration sensor, signals indicative of the sensed accelerations to a control system;
    receiving, at the control system, the transmitted signals from the acceleration sensor; and,
    identifying, via the control system, a load on the wind turbine based on the received signals by associating an acceleration value with each received signal and using at least one of the acceleration values to identify a displacement function usable by the control system to calculate a displacement of the rotor, wherein the calculated displacement is indicative of the load on the wind turbine.

2. A method of assembling a load identification system to a wind turbine having a rotor including a rotatable hub and a plurality of rotor blades coupled to the hub, said method comprising:
    coupling at least one acceleration sensor to the rotor;
    communicatively coupling the acceleration sensor with a control system, the acceleration sensor configured to sense accelerations of the rotor in three dimensions and to transmit signals indicative of the sensed accelerations to the control system, the control system configured to receive the signals from the acceleration sensor and to identify a load on the wind turbine based on the received signals; and,
    programming the control system to:
        associate an acceleration value with each received signal; and,
        use at least one of the acceleration values to identify a displacement function usable by the control system to calculate a displacement of the rotor, wherein the calculated displacement is indicative of the load on the wind turbine.

3. A method in accordance with claim 2, wherein coupling at least one acceleration sensor to the rotor comprises mounting the acceleration sensor within the hub.

4. A method in accordance with claim 3, wherein the hub includes a pitch drive coupled to each rotor blade of the plurality of rotor blades, said method further comprising programming the control system to control the pitch drive of at least one rotor blade of the plurality of rotor blades in response to the identified load on the wind turbine.

5. A method in accordance with claim 3, wherein the plurality of rotor blades includes a first blade, a second blade, and a third blade, said mounting the acceleration sensor within the hub comprises mounting a first acceleration sensor with respect to the first blade, mounting a second acceleration sensor with respect to the second blade, and mounting a third acceleration sensor with respect to the third blade.

6. A method in accordance with claim 3, wherein the hub includes an axis box, said mounting the acceleration sensor within the hub comprises mounting the acceleration sensor within the axis box.

7. A method in accordance with claim 2, further comprising programming the control system to:
    identify a "zero" position of the rotor; and,
    calculate the displacement of the rotor relative to the "zero" position.

8. A method in accordance with claim 2, further comprising programming the control system to:
    input at least one of the acceleration values into an acceleration function;
    integrate the acceleration function into a velocity function; and,
    integrate the velocity function into the displacement function.

9. A method in accordance with claim 8, further comprising programming the control system to:
    calculate a rotational order of the rotor; and,
    input the rotational order of the rotor into the acceleration function prior to integrating the acceleration function.

10. A method in accordance with claim 2, wherein coupling at least one acceleration sensor to the rotor comprises coupling a plurality of acceleration sensors to the rotor, said method further comprising programming the control system to identify a first predetermined group of acceleration sensors and a second predetermined group of acceleration sensors from the plurality of acceleration sensors, the control system configured to use only signals received from the first predetermined group of acceleration sensors to identify the load on the wind turbine.

* * * * *